(12) United States Patent
Mischler et al.

(10) Patent No.: US 7,653,974 B2
(45) Date of Patent: Feb. 2, 2010

(54) PALLET HANDLING SYSTEM FOR A MACHINE TOOL

(75) Inventors: Peter L. Mischler, Rockton, IL (US); Michael George Bayes, Telford (GB)

(73) Assignee: Cincinnati Machine, LLC, Hebron, KY (US)

( * ) Notice: Subject to any disclaimer, the term of this patent is extended or adjusted under 35 U.S.C. 154(b) by 127 days.

(21) Appl. No.: 12/099,497

(22) Filed: Apr. 8, 2008

(65) Prior Publication Data

US 2009/0252581 A1    Oct. 8, 2009

(51) Int. Cl.
*B23Q 41/02*    (2006.01)

(52) U.S. Cl. ............... 29/33 P; 198/345.3; 269/21; 269/35; 269/309

(58) Field of Classification Search .......... 29/33 P, 29/563; 198/345.3, 346.1; 269/21, 20, 35, 269/309, 289 MR
See application file for complete search history.

(56) References Cited

U.S. PATENT DOCUMENTS

| | | | | |
|---|---|---|---|---|
| 5,564,483 A | * | 10/1996 | Sacchi | 29/33 P |
| 5,582,396 A | * | 12/1996 | Brasca et al. | 269/309 |
| 5,715,585 A | * | 2/1998 | Zachau et al. | 29/33 P |
| 6,264,185 B1 | * | 7/2001 | Isobe et al. | 269/21 |
| 6,572,091 B2 | * | 6/2003 | Kimble | 269/21 |
| 2006/0260907 A1 | | 11/2006 | Ota | |

FOREIGN PATENT DOCUMENTS

JP    01-275327 A    * 11/1989

* cited by examiner

*Primary Examiner*—Erica E Cadugan
(74) *Attorney, Agent, or Firm*—Reising Ethington P.C.

(57) ABSTRACT

A machine tool has pass-through pallet loading allowing pallets to be loaded or discharged from either side of the machine. The pallet receiver is mounted on the X-axis of the machine, and the pallet is loaded onto the pallet receiver with the pallet in a vertical orientation. Cross axis rollers on the pallet receiver support the pallet and spacing rollers maintain the pallet spaced from Z-axis locating pads as it moves to a centered position on the pallet receiver. The Z-axis pads present a relatively large surface area to the rear face of the pallet, and are configured to provide vacuum clamping to lock the pallet in all three axes once it is centered on the pallet receiver. A rotating key is provided to center and lock the pallet relative to the pallet receiver before the vacuum clamping is applied.

15 Claims, 14 Drawing Sheets

PALLET HANDLING SYSTEM FOR A MACHINE TOOL

FIELD OF THE INVENTION

A machine tool receives a vertically oriented pallet on a pallet receiver with a workpiece clamped to the pallet and uses vacuum to clamp the pallet to the pallet receiver.

BACKGROUND OF THE INVENTION

A plate mill type of machine tool is used to machine large flat workpieces having a substantial length and width, but relatively little height. Because the workpiece is prone to deformation in the direction of its height axis, a rigid pallet is required to stabilize the workpiece during a machining operation.

There are certain advantages for holding the pallet and the workpiece in a plate mill in the vertical position. In order for this to occur, a mechanism has to be provided to receive the pallet in the machine in a vertical orientation, and to lock the pallet to a pallet receiver so that the pallet can be properly positioned relative to the working tool. Examples of pallet clamping in the prior art have utilized a multitude of mechanical clamps that use spring elements, hydraulics or pneumatics for actuation and locking. Switchable magnetic elements have also been used to lock a pallet.

BRIEF SUMMARY OF THE INVENTION

A machine tool is able to receive and discharge pallets from either side of the machine and uses a vacuum system to clamp the pallet to a pallet receiver mounted on the X-axis of the machine tool. The pallet is loaded onto the pallet receiver in the vertical orientation, and the weight of the pallet and the workpiece, and the position of the center of gravity of the pallet and the workpiece is used to force the pallet against locating pads on the pallet receiver. The pallet is lowered onto locators on the pallet receiver using gravity to pull it into location in the Y and Z-axes. As a result, the vacuum clamping mechanism gains the assistance of the mass moment of the pallet and the workpiece. The locators for the Z-axis consist of pads with a relatively large surface area that are configured to provide vacuum clamping to "lock" the pallet in all three axes once it is centered on the pallet receiver. A centering mechanism for the pallet precisely positions the pallet on the pallet receiver, and allows the pallet to be loaded into the machine tool and received by the pallet receiver from either side of the machine tool.

DETAILED DESCRIPTION OF THE INVENTION

Machine Configuration

Figure 1:
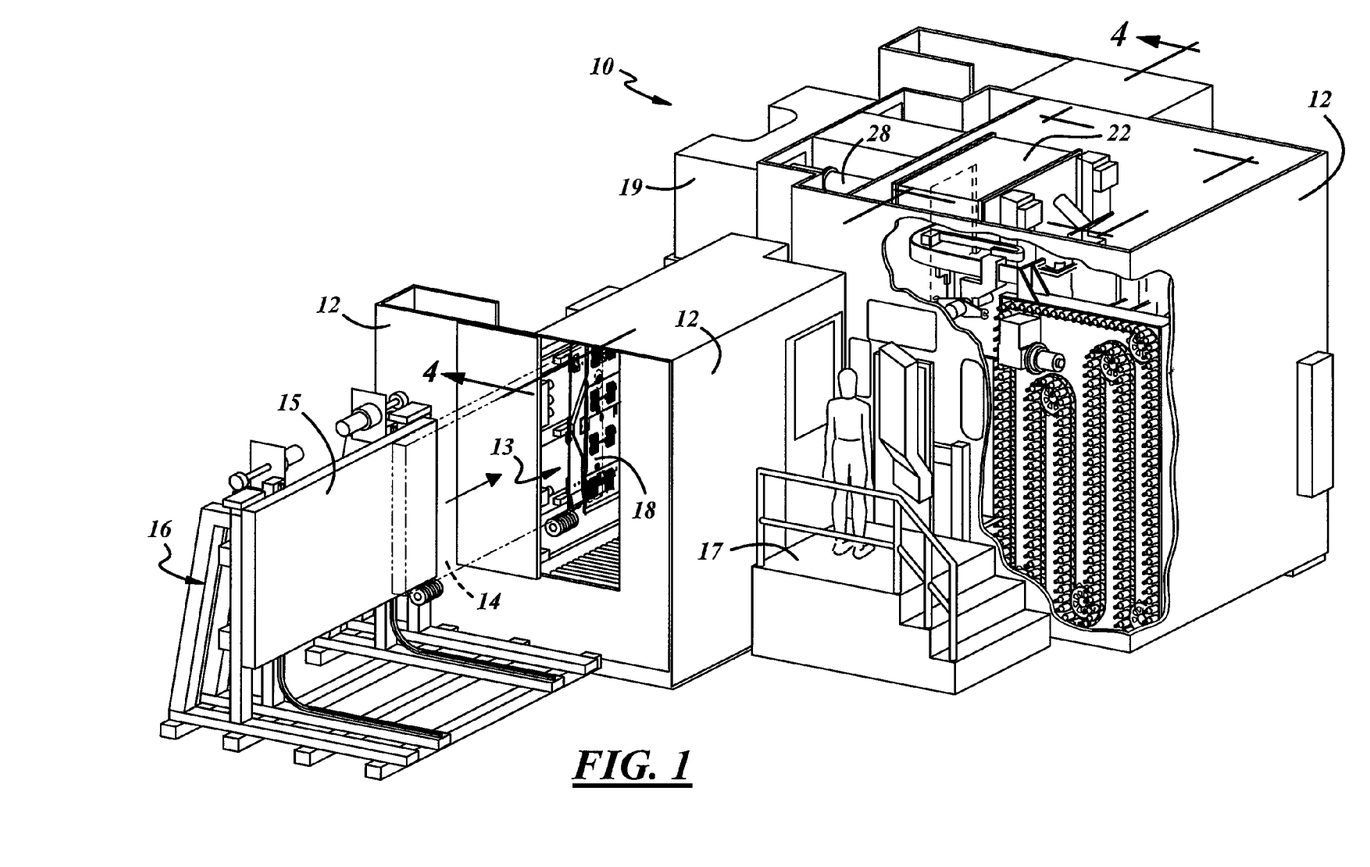
FIG. 1 is a perspective view of a machine tool according to the invention.

Turning now to FIG. 1, a machine tool is generally designated by the reference numeral 10. The machine is surrounded by guarding 12 and has an access opening 13 through which a pallet 14 may be introduced into the machine. The pallet 14 is held in a loading position on a pallet support plate 15 of a pallet loader 16. An operator station 17 outside of the guarding 12 allows an operator to program and control the operation of the machine tool, and to view the tool magazine and the automatic tool changer.

Figure 2:
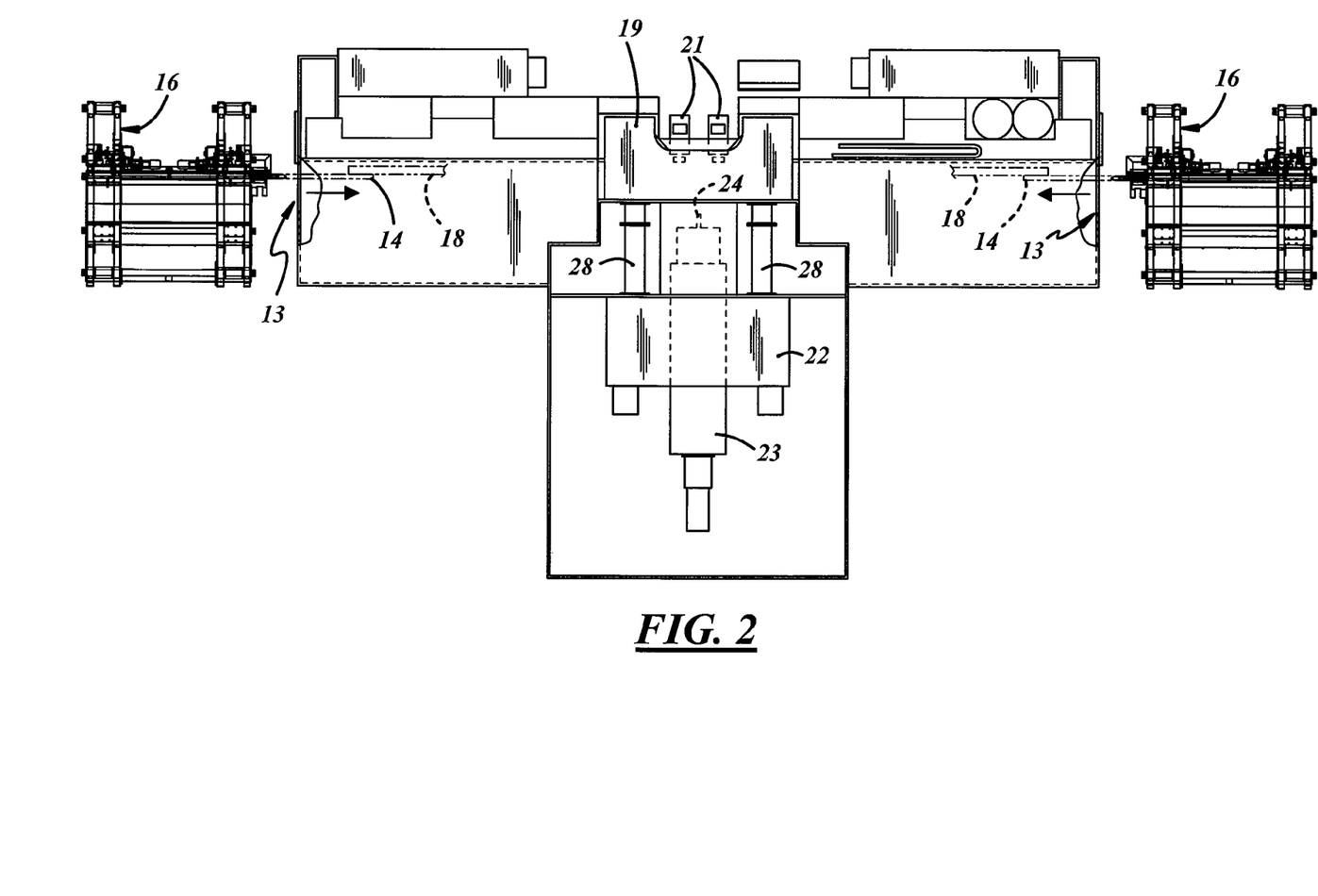
FIG. 2 is a plan view of the machine tool of FIG. 1.

FIG. 2 is a top view of the machine tool of FIG. 1 showing workpiece loading openings 13 for a pallet 14 on either side of the machine, and a pallet loader 16 positioned adjacent each loading opening. The machine includes a pallet receiver 18 that receives a pallet 14 from one of the pallet loaders 16 and conveys the pallet along the X-axis as more fully explained below. The machine tool comprises an X-axis frame member 19 that supports a plurality of X-axis drive motors 21 for moving the pallet receiver 18 along the X-axis of the machine.

FIG. 2 shows the top of the Y-axis column 22 that supports a Z-axis ram 23. The Z-axis ram 23 drives a working tool 24 as well understood in the art. The tool 24 is positioned in a workzone that is positioned between the X-axis frame member 19 and the Y-axis column 22.

Figure 3:
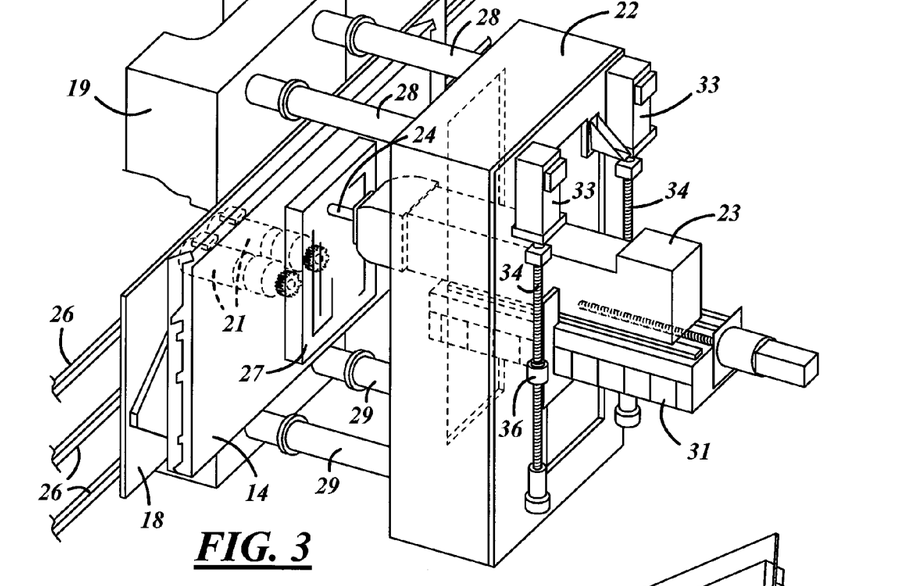
FIG. 3 is a simplified perspective view of the machine tool of FIG. 1.

FIG. 3 is a simplified view of the X, Y, and Z-axis elements of the machine tool. The X-axis rails 26 are mounted on the X-axis frame member 19, and extend from the left to the right side of the machine to provide the machine with pass-through pallet handling. As described above, pallets 14 may be loaded onto the pallet receiver 18 of the machine from either the left or right side of the machine. The pallet 14 in FIG. 3 is shown with a workpiece 27 clamped thereon. The clamping may be performed with mechanical, hydraulic, or electromagnetic clamping elements as well known in the art. After the workpiece 27 has been machined, it may be discharged from the machine from either the left or right side of the machine depending on the particular pallet handling automation system that is provided to serve the machine.

The X-axis frame member 19 is rigidly coupled to the Y-axis column 22 by upper and lower tubular frame tube members 28 and 29, respectively. The Y-axis column 22 is bifurcated and carries a vertically movable saddle 31 that is mounted on vertical linear guides or ways 32 best seen if FIG. 4. A servomotor 33 is mounted on each side of the Y-axis column 22, and each servomotor is coupled to a drive screw 34. The drive screws 34 engage drive nuts 36 on opposite sides of the saddle 31, and the servomotors 33 are used to raise and lower the saddle to the desired vertical position. The servomotors 33 and the Y-axis ways 32 are located on the opposite side of the Y-axis column 22 from the workzone. The vertically movable saddle 31 carries the Z-axis ram 23.

Figure 4:
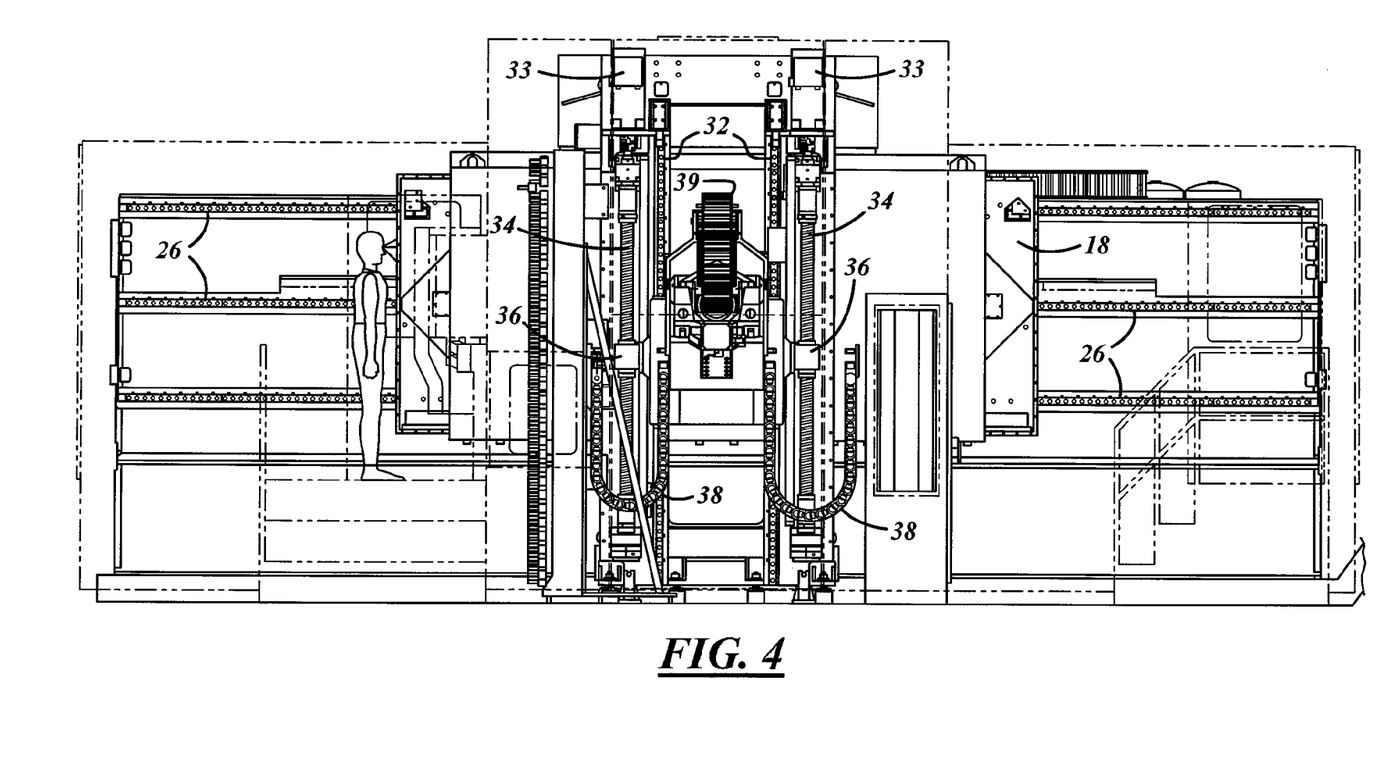
FIG. 4 is a sectional view taken along line 4-4 of FIG. 1 showing the Y-axis column and a portion of the pallet receiver on the X-axis rails.

FIG. 4 is a sectional view of the machine tool showing the detail of the Y-axis column and drive assembly. Flexible Y-axis cable guides 38 are provided to couple power, hydraulics and other utilities as required from the fixed structure of the machine to the movable saddle 31. Similarly, a Z-axis cable guide 39 is used to couple power and hydraulics from the saddle 31 to the relatively movable Z-axis ram 23. FIG. 4 also shows the X-axis rails 26 that extend from one side of the machine to the other to support the pallet receiver 18.

Figure 5:
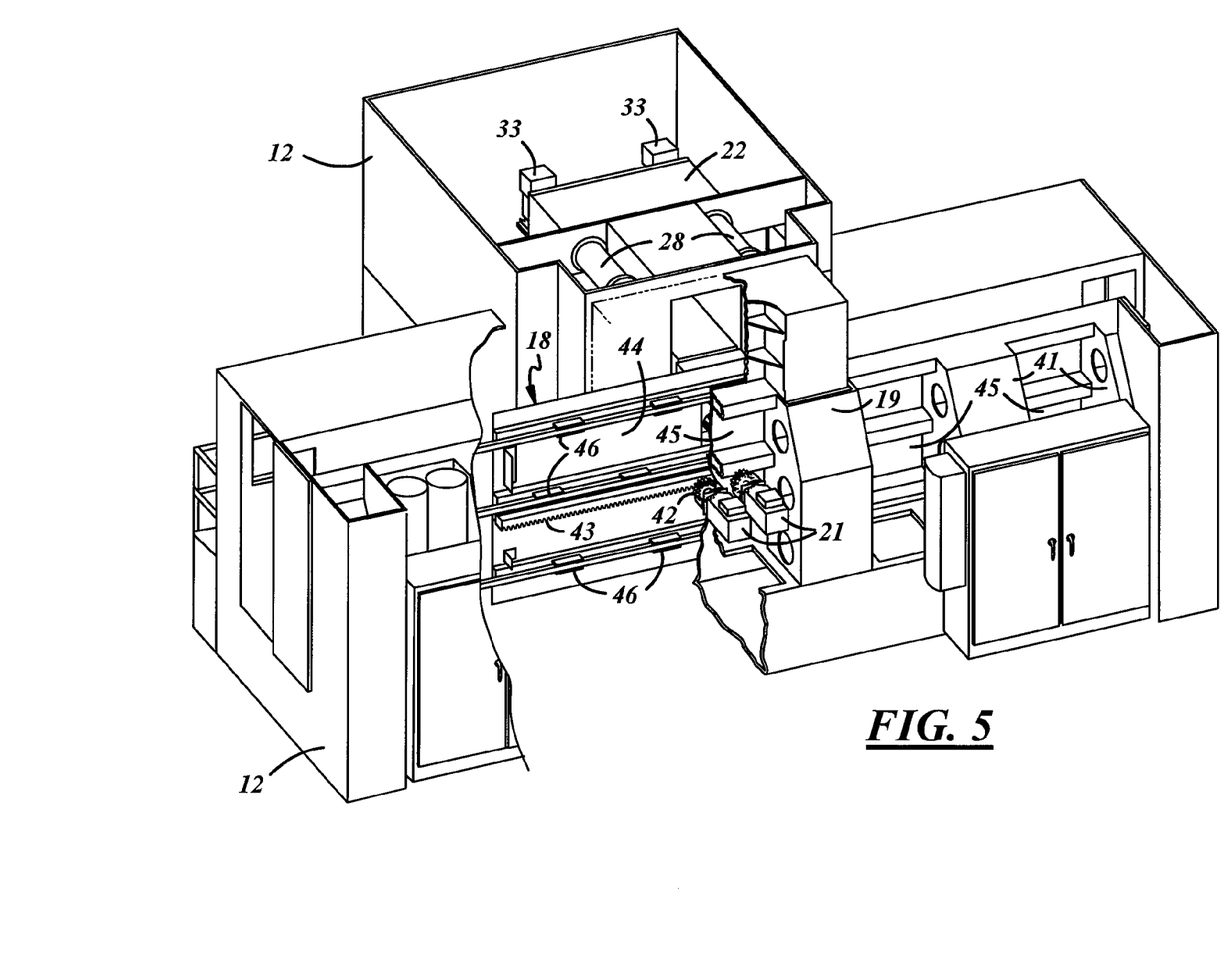
FIG. 5 is a perspective view partly broken to show the X-axis frame members, the back of the pallet receiver and the X-axis drive.

FIG. 5 is a perspective view of the back of the machine tool showing the X-axis wall 45 that is attached to the X-axis frame members 19 and 41. The X-axis rails are mounted on the X-axis wall 45. The X-axis drive motors 21 are mounted on an X-axis wall 45 on the X-axis frame member 19, and the motors drive pinion gears 42 that are engaged with an elongated rack 43 on the rear face 44 of the pallet receiver 18. The pallet receiver 18 may be driven back-and-forth across the X-axis rails 26 by the X-axis drive motors 21. In the embodiment shown, two X-axis drive motors are used, although other drive configurations are possible.

Figure 6:
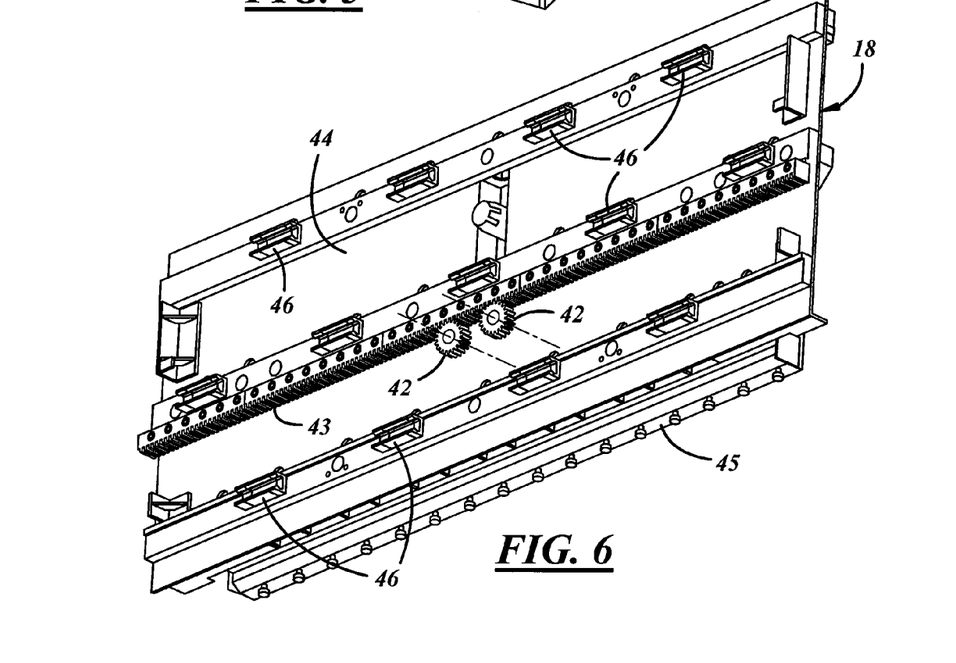
FIG. 6 is a detail view of the back of the pallet receiver.

FIG. 6 shows the rear face 44 of the pallet receiver 18. The pallet receiver comprises a generally rectangular structure having a plurality of rail followers 46 mounted on the rear face thereof for engaging the X-axis rails 26. The elongated rack 43 is mounted on the rear face of the pallet receiver in the direction of the X-axis. The elongated rack 43 is engaged by one or more pinion gears 42 that are driven by X-axis drive motors 21 to drive the pallet receiver back and forth across the X-axis of the machine. The bottom edge 45 of the pallet 14 is visible below the bottom edge of the pallet receiver 18.

Figure 7:
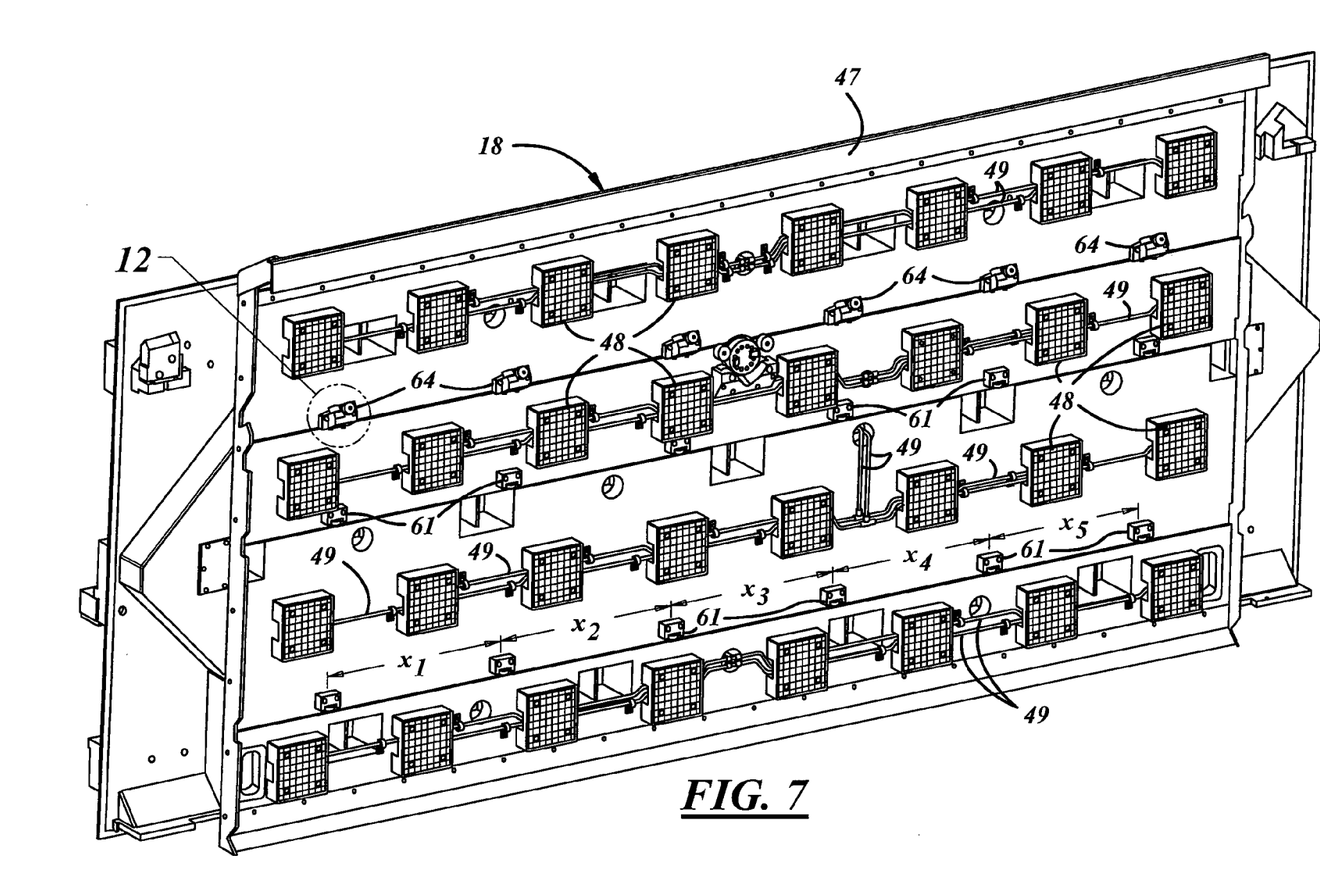
FIG. 7 shows the front of the pallet receiver.

FIG. 7 shows the front surface 47 of the pallet receiver. A plurality of Z-axis pads 48 are mounted on the front of the pallet receiver 18 in a rectangular array and create the Z-axis plane against which the pallet 14 will be clamped. Each Z-axis pad 48 is coupled to a vacuum supply line 49 that is attached to the rear surface of the pad as described below in connection with FIG. 8. A vacuum pump (not shown) is mounted on the machine, and the vacuum pump is coupled by a flexible hose to the vacuum supply lines on the pallet receiver. A plurality of separate vacuum supplies may be used to supply different pads 48 to create redundancy and increase safety in the event of the failure of one of the supplies.

Figure 8:
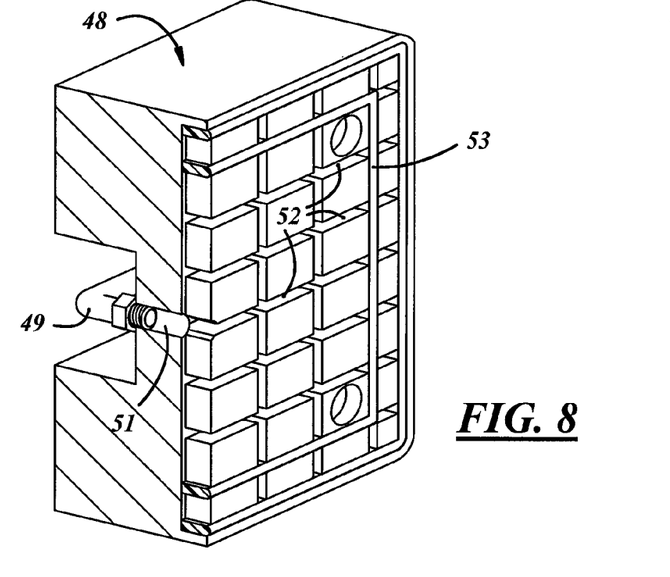
FIG. 8 is a detail view of one of the Z-axis support pads on the pallet receiver.

FIG. 8 is a perspective view, partly in section, of one of the Z-axis pads 48. A through passage 51 couples the vacuum line 49 to an array of interconnected channels 52 formed on the front surface of the pad. A sealing element 53 or sealing material is provided in the channels around the perimeter of the pad 48 to prevent the vacuum pressure from escaping from the sides of the pad when the vacuum pressure is used to clamp a pallet 14 to the pallet receiver as described below.

The Z-axis locators on the pallet receiver for the pallet 14 comprise the array of pads 48 that are positioned on the front face 47 of the pallet receiver. The support pads 48 present a relatively large surface area to the back of the pallet 14 and allow for a more rigid connection between the pallet and the pallet receiver 18 than would be provided by clamping the pallet around its periphery only, and thereby reduce the amount of stiffness required in the pallet itself.

Figure 9:
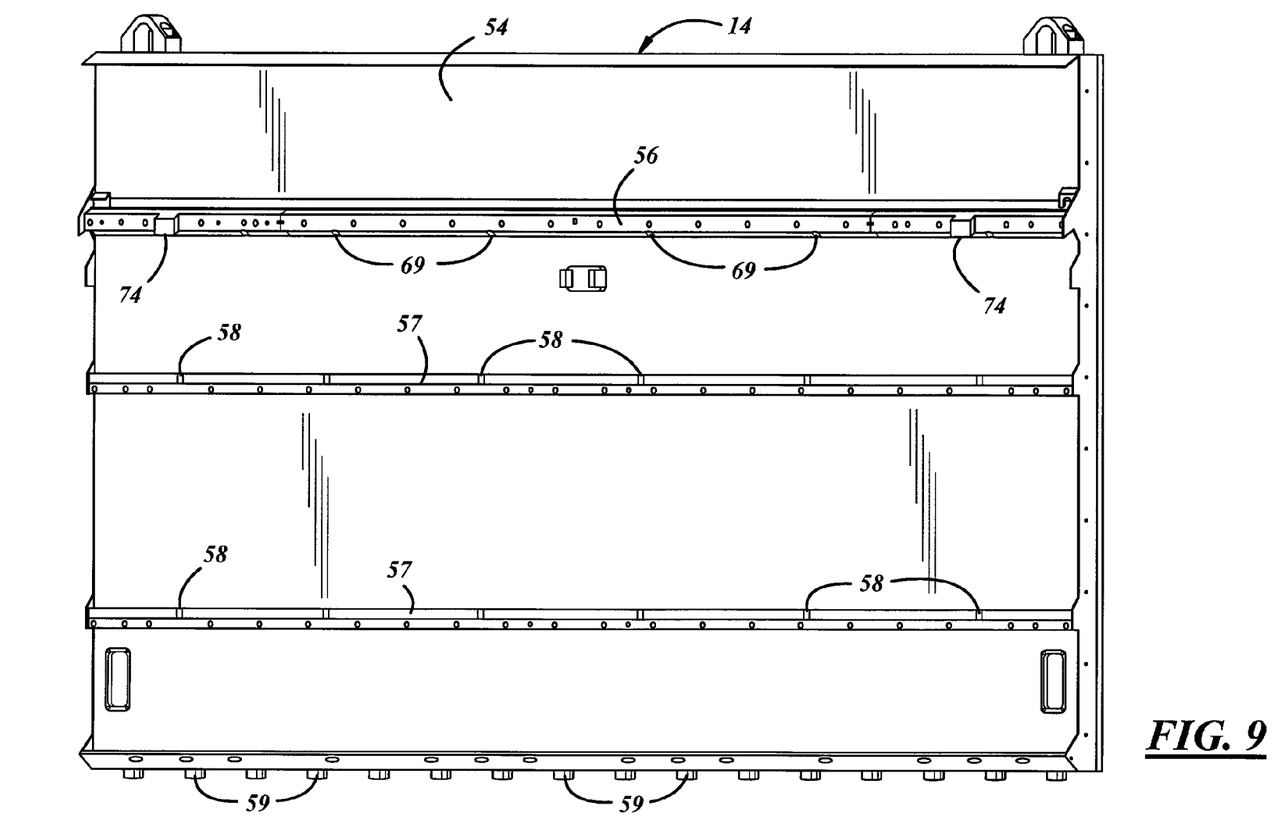
FIG. 9 is a detail view of the back of the pallet showing the support rib and the spacing ribs.

FIG. 9 shows the back surface 54 of the pallet. The pallet is generally rectangular and has a horizontal support rail 56 extending from one side of the pallet to the other. Two standoff rails 57 are also formed on the back of the pallet and extend from one side of the pallet to the other. The standoff rails 57 have a plurality of detents 58 formed in their surface that are spaced unequal amounts from one another, but that are spaced to match the spacing between the standoff rollers 61 that are mounted on the face of the pallet receiver 18 as more fully described below. A plurality of cam followers 59 are mounted on the bottom edge of the pallet. The cam followers 59 are provided to allow the pallet to be driven by a rotating cam mechanism into and out of the machine tool from the pallet loader 16. Other commonly known expedients may be used to drive the pallet into and out of the machine tool.

Returning to FIG. 7, two rows of standoff rollers 61 are mounted on the front surface 47 of the pallet receiver. The standoff rollers 61 engage and support the standoff rails 57 on the back of the pallet 14 as shown on FIG. 9 to prevent the pallet from scraping across the Z-axis pads 48 as the pallet is moved along the X-axis to a centered position on the pallet receiver 18. The spacing between each of the adjacent standoff rollers 61 is unique so that distances $X_1$, $X_2$, $X_3$, $X_4$, and $X_5$ as shown on FIG. 7 are all unequal to one another. The horizontal standoff rails 57 include detents 58 best seen in FIG. 9 that are spaced from one another to correspond with the spacing between the adjacent standoff rollers 61.

As the pallet 14 is moved into position on the pallet receiver 18, the unequal spacing between adjacent standoff rollers 61 and the detents 58 in the standoff rails prevents more than one detent 58 from coming into alignment with any of the standoff rollers 61 at any one time, except when the pallet is centered on the pallet receiver. This allows the standoff rollers 61 to maintain the pallet a fixed distance from the pallet receiver 18 as determined by the depth D of the standoff rails as shown of FIG. 10, and maintains the rear face 54 of the pallet spaced from the Z-axis pads 48. However, when the pallet 14 is centered on the pallet receiver 18, all of the detents 58 in the standoff rails 57 line up with all of the standoff rollers 61 and this allows the pallet to move in the Z-axis direction toward the front surface 47 of the pallet receiver, causing the rear face 54 of the pallet to rest on the Z-axis pads 48.

Figure 11:
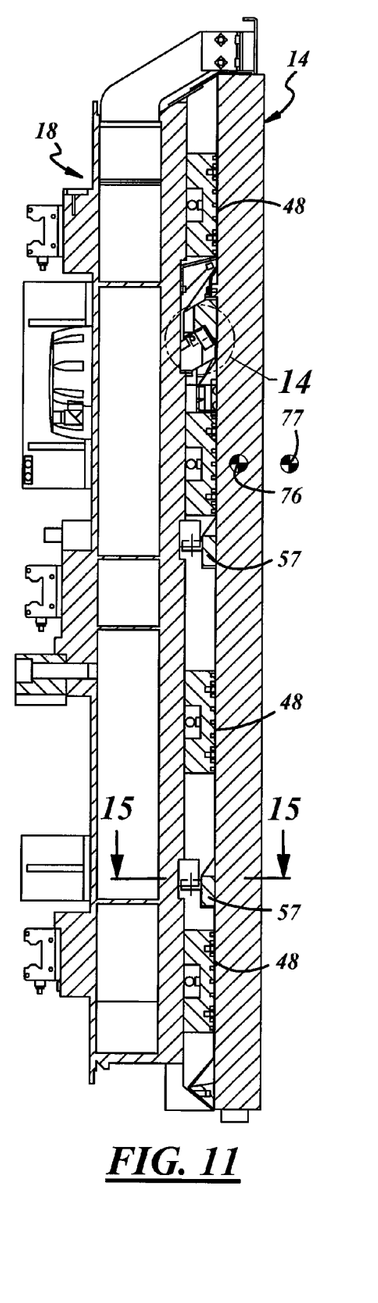
Figure 15:
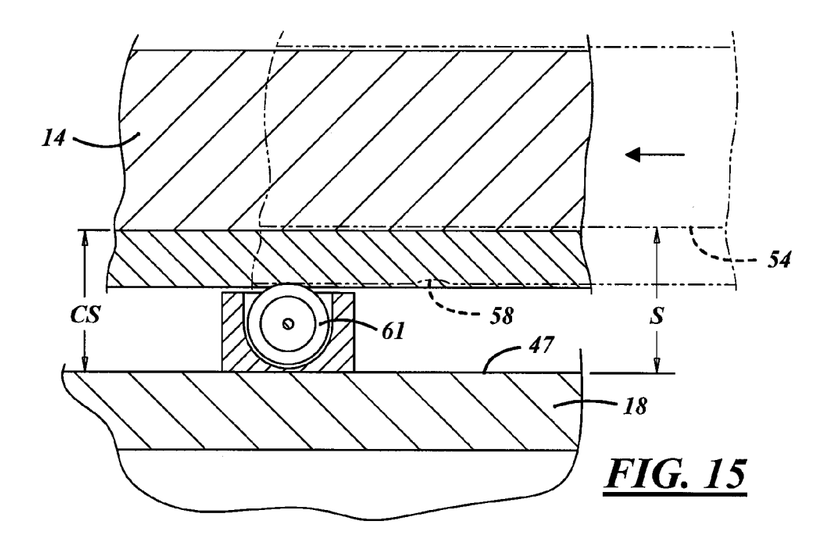
FIG. 15 is a sectional view taken along line 15-15 of FIG. 11 showing the engagement of a spacing roller on the pallet receiver with a spacing rib on the rear of the pallet.

FIG. 15 shows in phantom the spacing S of the rear face 54 of the pallet from the front face 47 of the pallet receiver when the standoff roller 61 engages the standoff rail 57, and shows in full the closer spacing CS between the pallet and the pallet receiver when the standoff roller 61 enters the detent 58 on the standoff rail. When the pallet 14 is in this closer position to the pallet receiver as shown in full, the rear face 54 of the pallet comes into contact with the Z-axis pads 48 on the pallet receiver as shown in FIG. 11.

Figure 12:
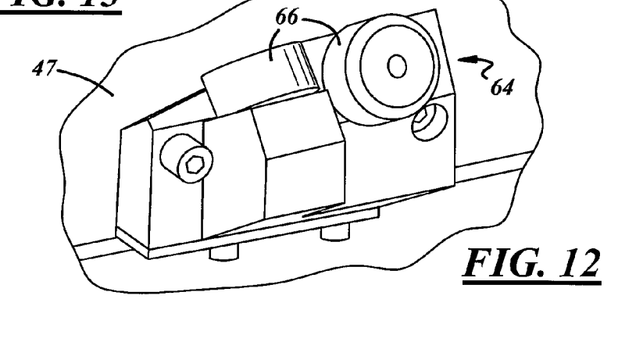
FIG. 12 is a detail view of a cross axis roller assembly.
Figure 13:
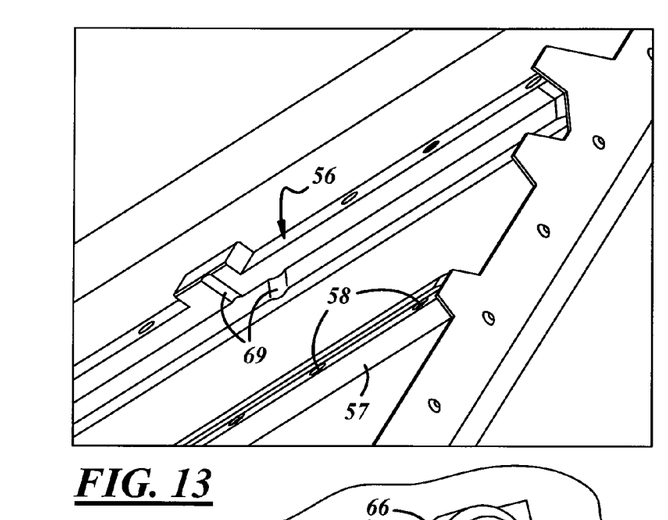
FIG. 13 is a detail view of a portion of the support rib on the rear surface of the pallet.
Figure 14:
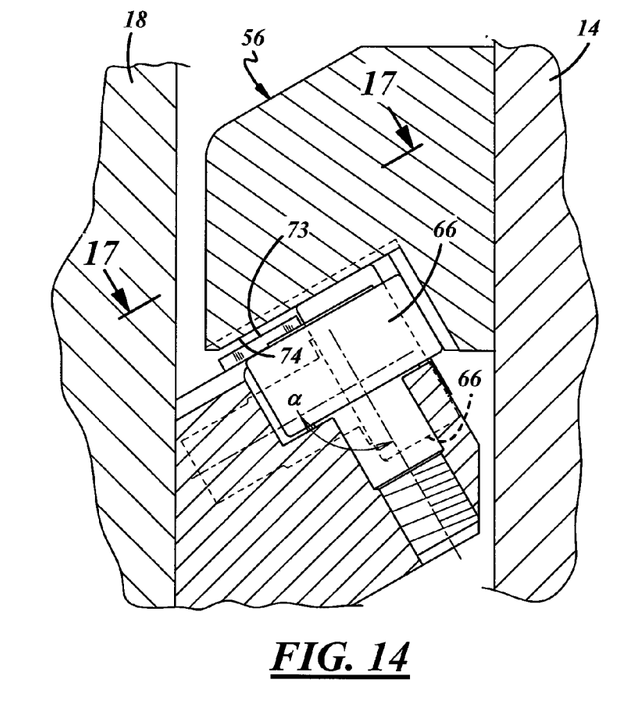
FIG. 14 is a side view partly in section of the cross axis roller assembly on the pallet receiver engaging the support rib on the rear surface of the pallet.
Figure 16:
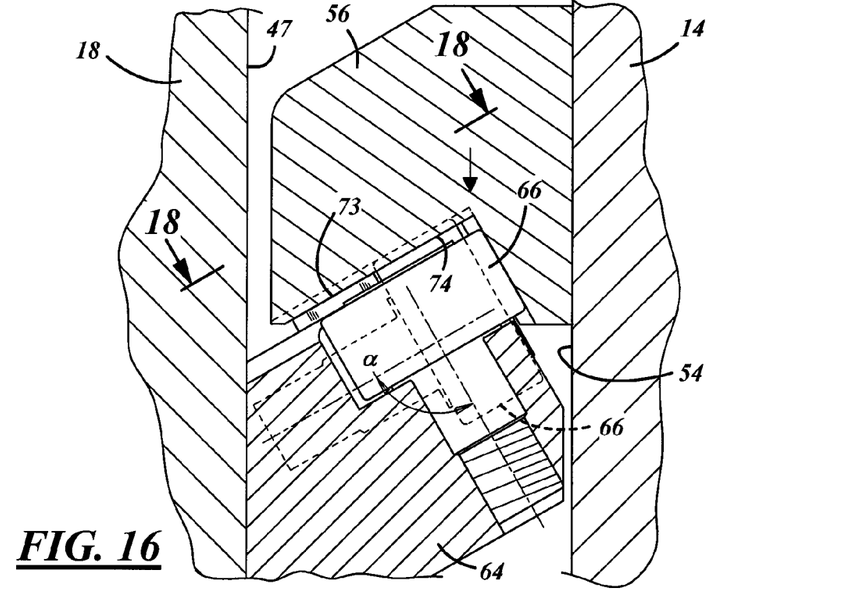
FIG. 16 is a sectional view similar to FIG. 14 but showing the cross axis roller assembly in a detent of the support rib of the pallet.

A plurality of cross-axis roller assemblies 64 are mounted in a row aligned with the X-axis across the front face 47 of the pallet receiver. FIG. 12 is a perspective view of a single cross axis roller assembly 64. Each cross-axis roller assembly has a pair of support rollers 66 that are mounted with their axes at an angle α and ninety degrees to one another and oriented to form an inverted V. The cross-axis rollers 66 engage a support rail 56 mounted on the back of the pallet 14 that is formed with an inverted V-groove 68 as shown in FIGS. 13, 14 and 16. The surfaces of the V-groove 68 in the support rail are oriented at an angle α of ninety degrees from one another. The cross-axis support rollers 66 support the pallet 14 as it is being moved from the load stand to a centered position on the pallet receiver 18.

Figure 17:
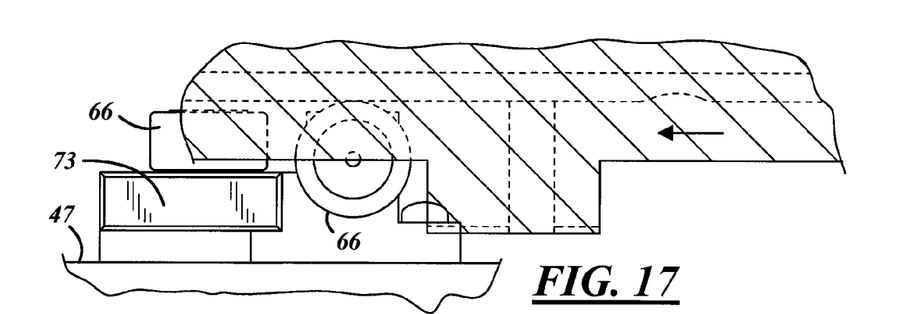
FIG. 17 is a sectional view taken along line 17-17 of FIG. 14 showing the engagement of the cross axis roller with the support rib on the rear surface of the pallet.
Figure 18:
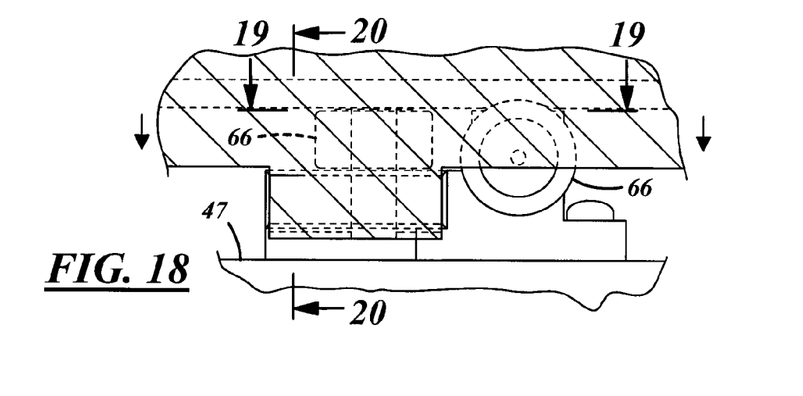
FIG. 18 is a sectional view taken along line 18-18 of FIG. 16 showing the engagement of the cross axis rollers with detents in the supporting rib on the rear surface of the pallet.
Figure 19:
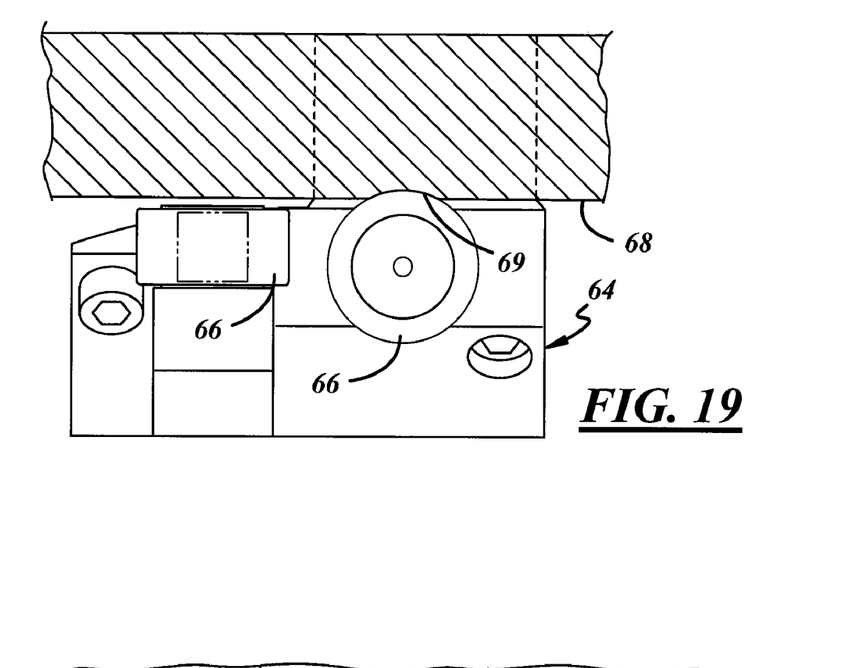
FIG. 19 is a sectional view taken along line 19-19 of FIG. 18 showing a cross axis roller engaging a detent in the supporting rib on the rear surface of the pallet.

As best seen in FIG. 13, the surfaces of the V-groove in the support rail are formed with detents 69 similar to the detents 58 that are formed in the standoff rails 57. In a manner similar to the spacing of the standoff rollers 61, the distance between adjacent cross axis roller assemblies 64 is unique so that the detents 69 in the V-groove 68 of the support rail 56 do not align with the support rollers 66 except when the pallet 14 is approximately centered on the pallet receiver 18. When the pallet is approximately centered on the pallet receiver, the support rollers 66 line-up with the detents 69 in the V-groove of the support rail and allow the pallet to drop slightly relative to the pallet receiver. The slight drop in the position of the pallet is accompanied by a shift of the position of the pallet toward the pallet receiver 18 which allows the rear face 54 of the pallet to come into contact with the Z-axis pads 48. FIGS. 14 and 17 show the support rollers 66 in the flat portion of the V-axis groove 68. FIGS. 16, 18 and 19 show the support rollers 66 in the detents 69 in the V-axis groove 68.

Figure 20:
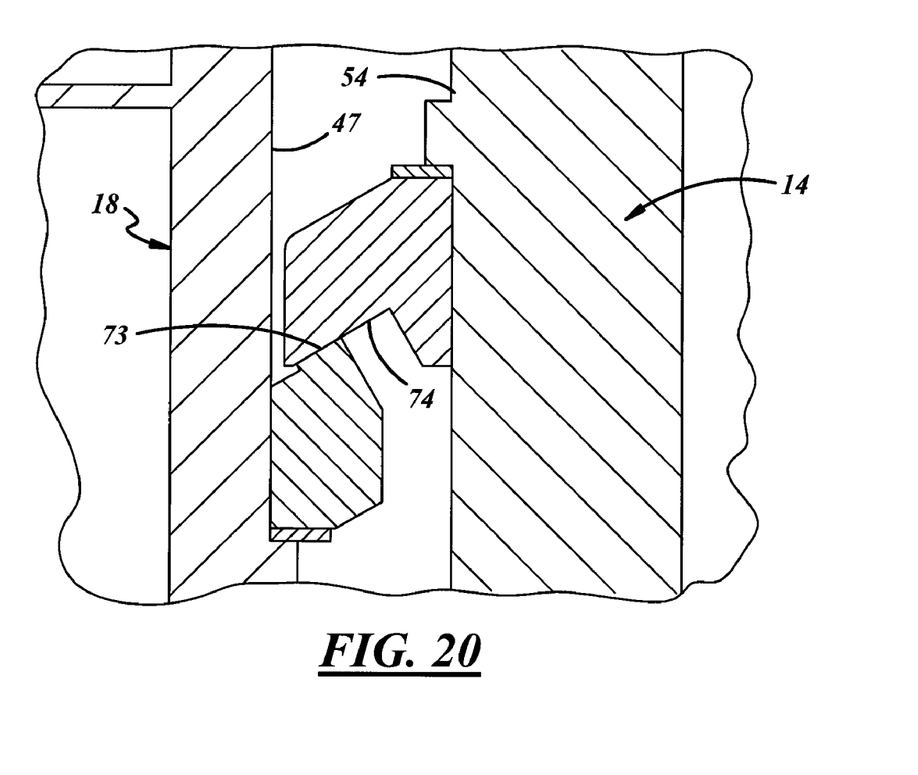
FIG. 20 is a sectional view taken along line 20-20 of FIG. 18 showing the engagement of a vertical suspension hook on the rear of the pallet with a vertical locator support on the front of the pallet receiver.

The cross axis roller assemblies 64 are each provided with a vertical locator support surface 73. FIGS. 14, 16, and 17 show the vertical locator support surface 73 on the cross axis roller assembly. In the preferred embodiment, the support surfaces 73 on the two cross axis roller assemblies 64 on either end of the row of cross axis roller assemblies receive and support a complimentary shaped vertical suspension hook 74 that is mounted on either end of the back of the pallet 14 as shown generally in FIG. 9 and in detail in FIG. 20. The engagement of the vertical suspension hook 74 with the vertical locator support 73 precisely locates the pallet 14 on the pallet receiver 18 with respect to the Y-axis. Other combinations or all of the roller assemblies 64 may receive a vertical suspension hook 74.

To load a pallet onto a pallet receiver, the pallet 14 rolls onto the machine from the pallet loader 16 and when the pallet is centered on the pallet receiver 18, the detents 69 in the horizontal support rail 56 cause the pallet to lower onto the vertical locator supports 73 on the pallet receiver using gravity to pull it into location in the Y and Z-axes. At the same time, the engagement of the standoff rollers 61 with the detents 58 in the standoff rails 57 allow the pallet to move toward the pallet receiver 18 until the rear face 54 of the pallet is in contact with the Z-axis pads 48. The positioning of the vertical suspension hooks 74 on the back of the pallet is above and behind the center of gravity of the pallet, causing the pallet to pull back against the Z-axis pads 48 by gravity alone.

Figure 10:
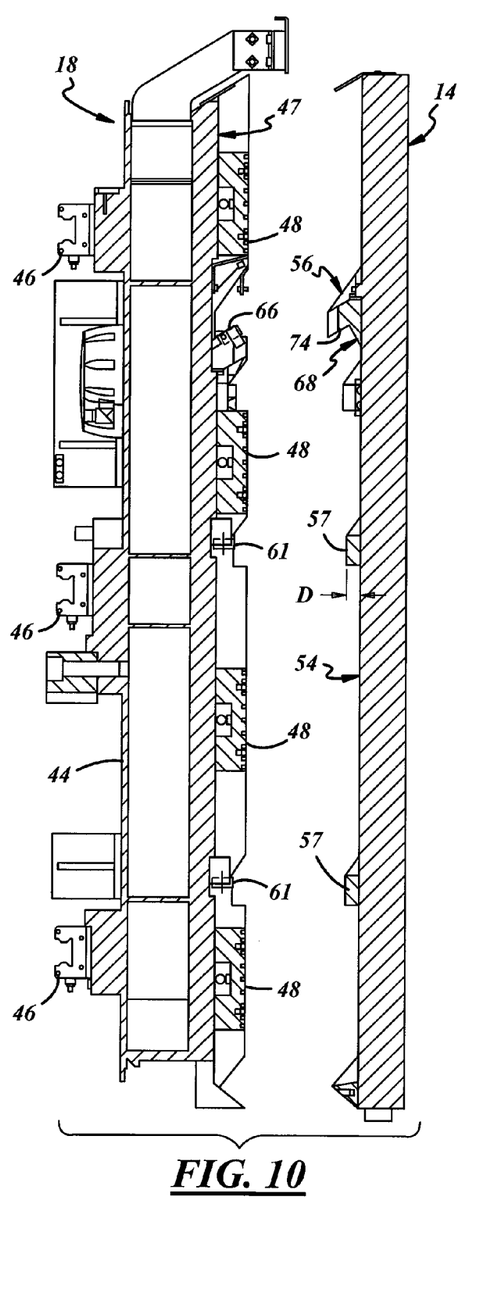
FIGS. 10 and 11 are side sectional views showing the mating surfaces of the pallet receiver and the pallet.

FIG. 10 shows the pallet 14 spaced from the pallet receiver 18. FIG. 11 shows the rear face 54 of the pallet in contact with the Z-axis pads 48 on the pallet receiver. The vertical or Y-axis location of the pallet is determined by the engagement of the vertical suspension hook 74 on the back of the pallet with the vertical locator support 73 on the front of the pallet receiver. The location of the vertical suspension hook 74 and the vertical locator support 73 above and behind the pallet center of gravity 76 causes the pallet to pull back against the Z-axis pads 48 under the force of gravity alone. The effect is unchanged when a workpiece is clamped to the pallet owing the position of the location of the center of gravity 77 of a pallet with a workpiece mounted thereon.

The pallet has to be precisely located on the pallet receiver in order for the workpiece on the pallet to be accurately machined.

Figures 21, 22, 23:
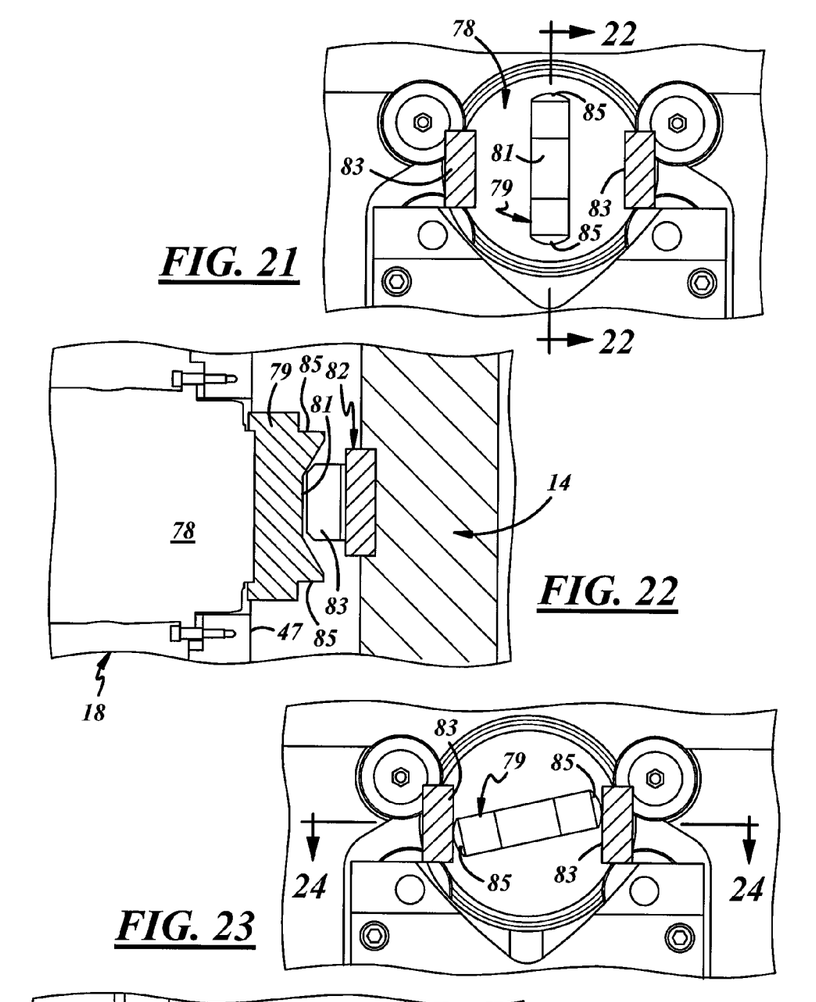
FIG. 21 is a front view of the centering mechanism on the pallet receiver for the pallet with the centering mechanism key in the pass position.
FIG. 22 is a sectional view of the centering mechanism taken along line 22-22 of FIG. 21.
FIG. 23 is a front view of the centering mechanism of FIG. 21 with the centering mechanism key in the lock position.
Figure 24:
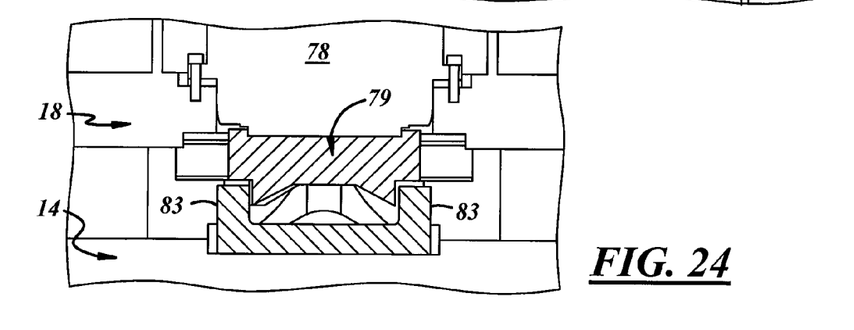
FIG. 24 is a sectional view taken along line 24-24 of FIG. 23.
Figure 25:
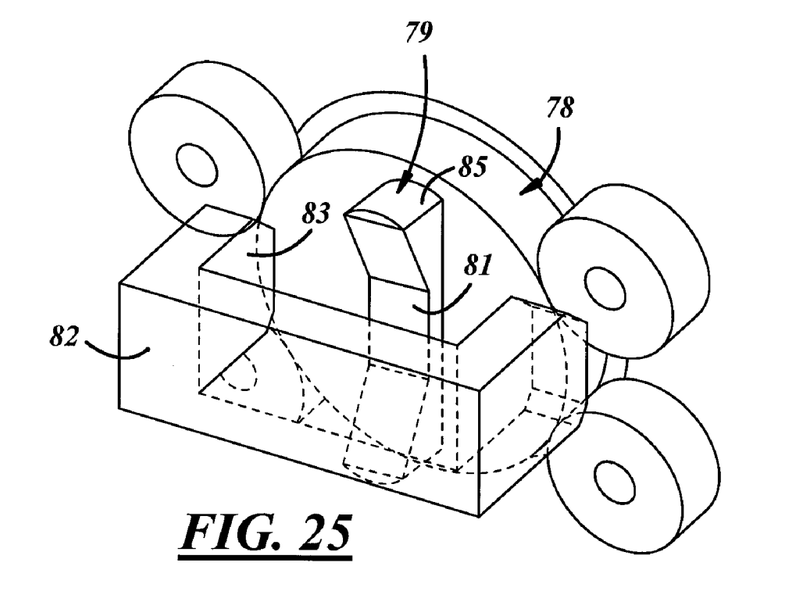
FIGS. 25 and 26 are perspective views of the lock and key mechanism showing the key in the pass and locked positions, respectively.
Figure 26:
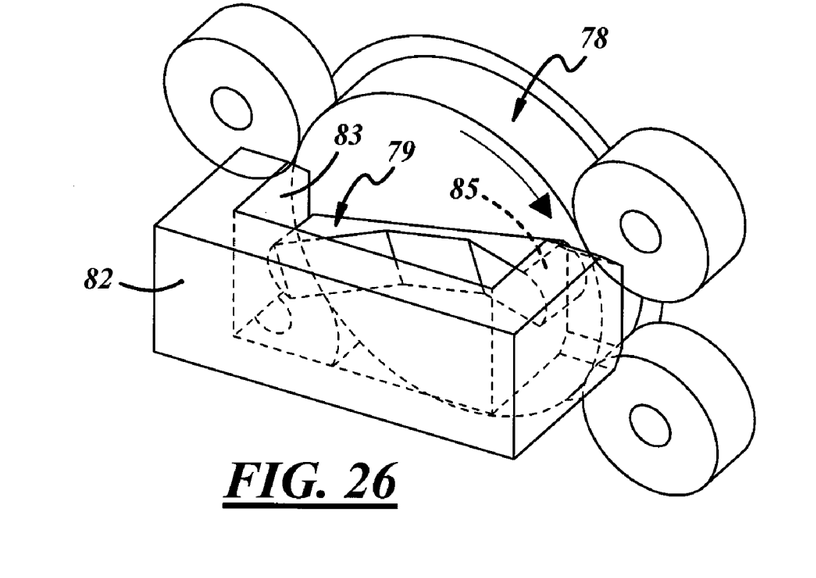

FIGS. 21-26 show the details of the mechanism for centering and locking the pallet on the pallet receiver. The pallet receiver 18 includes a centering arm 78 formed with a centering key 79. The centering key 79 is mounted for selective rotation relative to the pallet receiver, and includes cam surfaces 85 on the ends thereof and a clearance slot 81 located between the cam surfaces 85. A centering lock 82 is mounted on the back of the pallet. The centering lock has two horizontally opposed abutments 83 formed on either end thereof. With the centering key 79 in the vertical position as shown in FIGS. 21, 22 and 25, the abutments 83 on the centering lock pass through the clearance slot 81, allowing X-axis displacement of the pallet 14 relative to the pallet receiver 18. When the pallet is approximately centered on the pallet receiver, the locking key 79 may be rotated from a vertical position toward a horizontal position as shown in FIGS. 23, 24, and 26. This rotation causes the cam surfaces 85 of the centering key 79 to engage the abutments 83 on the centering lock 82, and brings the pallet to a final centered position on the pallet receiver. Once the pallet is centered on the pallet receiver, the symmetry of the locking arm 78 and the centering lock 82 ensures that the pallet is centered on the receiver regardless of the direction from which it has entered the pallet receiver (the left or the right side of the machine), and regardless of any variation in the width between the two lock abutments 83 on the centering lock 82. The ability to load the pallet from either the left or the right side of the machine greatly increases the number of machine and system configurations that are possible, thus allowing the machine to be acceptable for a wide variety of user's needs.

Having thus described the invention, various alterations and modifications may be apparent to those skilled in the art, which modifications and alterations are to be considered to be within the scope of the invention as defined by the appended claims.

We claim:

1. A machine tool having an X, Y, and Z-axis and a working tool for machining a workpiece that is mounted on a pallet, the machine tool comprising:

a vertical pallet receiver for supporting the pallet in a vertical position with a planar workpiece-receiving surface of the pallet extending vertically in front of the working tool, the pallet receiver including an arrangement for supporting the pallet as the pallet is moved into or out of the machine tool;

a vacuum clamping system on the pallet receiver for clamping the pallet to the vertical pallet receiver, wherein the vacuum clamping system uses vacuum pressure alone to clamp the pallet to the pallet receiver.

2. The machine tool of claim 1 further comprising:
an array of Z-axis pads on the pallet receiver, the Z-axis pads locating the pallet in the Z-axis direction, and the Z-axis pads applying vacuum pressure to the rear face of the pallet to clamp the pallet to the pallet receiver.

3. The machine tool of claim 2 wherein the Z-axis pads lock the pallet in the X and Y axis directions using the vacuum pressure.

4. The machine tool of claim 3 wherein the Z-axis pads are mounted on the pallet receiver in a rectangular array.

5. The machine tool of claim 4 further comprising:
a vacuum supply line connected to each of the Z-axis pads for supplying vacuum pressure to the face of the pads.

6. The machine tool of claim 1 further comprising:
at least one vertical suspension hook on the back of the pallet, and at least one vertical support surface on the front of the pallet receiver, wherein the at least one vertical suspension hook engages the at least one vertical support surface to locate the pallet in the Y-axis direction.

7. The machine tool of claim 1 further comprising:
a pair of vertical suspension hooks on the back of the pallet, and a pair of vertical support surfaces on the front of the pallet receiver, whereby the pallet is located in the Y-axis direction by the engagement of the pair of suspension hooks with the pair of support surfaces.

8. The machine tool of claim 7 wherein the vertical suspension hooks are angled downward and the vertical support surfaces are angled upward, and the vertical support surfaces are positioned above and behind the center of gravity of the pallet causing the pallet to pull back against Z-axis pads of the vacuum clamping system by the force of gravity alone once the vertical suspension hooks have engaged the vertical support surfaces.

9. The machine tool of claim 1 further comprising:
a rotatable symmetrical arm mounted on the pallet receiver, the rotatable symmetrical arm having a centering key formed on face thereof;
cam surfaces formed on ends of the centering key; and,
a centering lock mounted on the back of the pallet, the centering lock having horizontally opposed abutments, wherein the centering key may be rotated in the centering lock toward a horizontal position, and the engagement of the cam surfaces on the centering key with the abutments on the centering lock act to center the pallet on the pallet receiver and precisely locate the pallet in the X-axis direction on the pallet receiver.

10. The machine tool of claim 9 further comprising:
a clearance slot on the centering key formed between the cam surfaces,
whereby with the centering key in a vertical position, the abutments of the centering lock pass through the clearance slot and do not engage the cam surfaces of the centering key.

11. The machine tool of claim 10 wherein the centering key is symmetrically formed so that the centering lock and the centering key can be used to center a pallet on the pallet receiver regardless of the direction along the X-axis from which the pallet is introduced onto the pallet receiver.

12. The machine tool of claim 1 wherein the pallet receiver is mounted for movement along the X-axis of the machine tool and the pallet may be introduced to the pallet receiver on either side of the machine tool and from either direction on the X-axis.

13. The machine tool of claim 1 further comprising:
at least one X-axis rail mounted along the X-axis of the machine tool;
rail followers mounted on the back of the pallet receiver for mounting the pallet receiver on the at least one X-axis rail; whereby the pallet receiver may be supported for movement along the X-axis of the machine tool by the engagement of the rail followers with the at least one X-axis rail;
wherein the arrangement for supporting the pallet as the pallet is moved into or out of the machine tool is in the form of support rollers mounted on the front of the pallet receiver;
a support rail mounted on the back of the pallet, whereby the pallet may be supported on the pallet receiver for movement along the support rail by the engagement of the support rollers with the support rail.

14. The machine tool of claim 13 further comprising:
at least one standoff roller mounted on the front of the pallet receiver;
at least one standoff rail mounted on the back of the pallet, whereby the back of the pallet may be spaced a predetermined distance from the front of the pallet receiver by the engagement of the at least one standoff rail with the at least one standoff roller.

15. The machine tool of claim 14 wherein the motion of the pallet receiver is limited to X-axis motion along the at least one X-axis rail.

* * * * *

UNITED STATES PATENT AND TRADEMARK OFFICE
CERTIFICATE OF CORRECTION

PATENT NO. : 7,653,974 B1  Page 1 of 1
APPLICATION NO. : 12/099497
DATED : February 2, 2010
INVENTOR(S) : Mischler et al.

It is certified that error appears in the above-identified patent and that said Letters Patent is hereby corrected as shown below:

Col. 3, line 24 after "seen" delete "if" and insert therein --in--
Col. 4, line 60 after "shown" delete "of" and insert therein --in--
Col. 6, line 13 after "owing" insert --to--
Col. 7, line 38 after "on" insert --a--

Signed and Sealed this

Sixteenth Day of November, 2010

David J. Kappos
*Director of the United States Patent and Trademark Office*